(No Model.)

A. L. GARFORD.
BICYCLE PEDAL.

No. 503,206.  Patented Aug. 15, 1893.

WITNESSES.
Frank Miller
M. S. Ingham

INVENTOR.
Arthur L. Garford
By Wing & Thurston
his attorneys

UNITED STATES PATENT OFFICE.

ARTHUR L. GARFORD, OF ELYRIA, OHIO.

BICYCLE-PEDAL.

SPECIFICATION forming part of Letters Patent No. 503,206, dated August 15, 1893.

Application filed October 18, 1892. Serial No. 449,224. (No model.)

*To all whom it may concern:*

Be it known that I, ARTHUR L. GARFORD, a citizen of the United States, residing at Elyria, in the county of Lorain and State of Ohio, have invented certain new and useful Improvements in Bicycle-Pedals; and I do hereby declare the following to be a full, clear, and exact description of the invention, such as will enable others skilled in the art to which it appertains to make and use the same.

My object is to provide a light, cheap and easy running pedal; and my invention consists in the construction and combination of parts hereinafter described and pointed out definitely in the claims.

Figure 1:
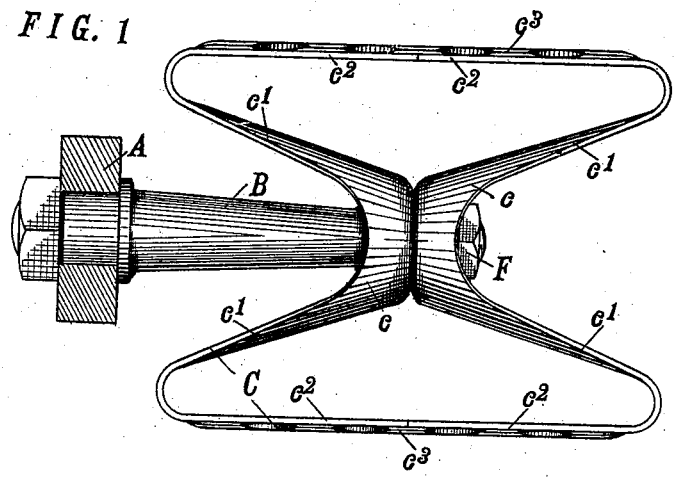
Figure 2:
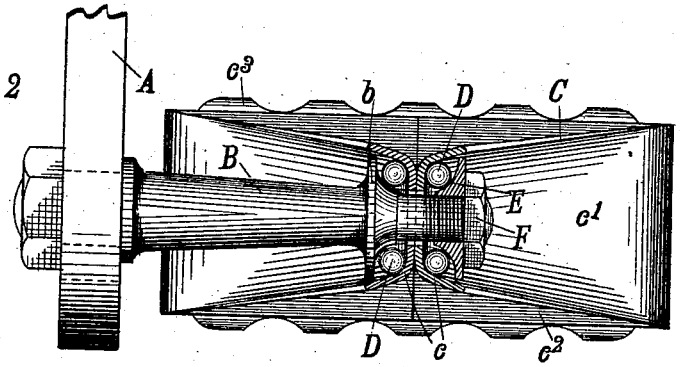
Figure 3:
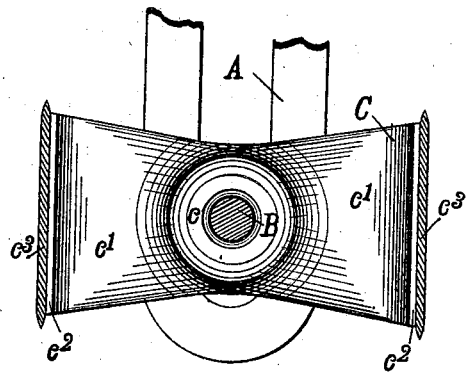

In the drawings, Figure 1 is a plan view of my improved pedal. Fig. 2 is a central longitudinal section; and Fig. 3 is a central transverse section.

Referring to the parts by letter, A represents the crank, and B the crank pin which is adapted to be secured to the crank in the usual manner.

$b$ represents a cone which is either integral with the crank pin or rigidly secured thereto by suitable means.

C represents the pedal frame. In the form shown it consists of two pieces of sheet metal, each of which is so bent between suitable dies that it consists of a cup $c$, two diverging arms $c'$ $c'$, and the side pieces $c^2 c^2$. The side pieces are secured together my means of the plates $c^3 c^3$ to which they are riveted, or in any other suitable manner. When the parts of the frame are fastened together as shown, the two cups lie back to back, and at or very near the center of the frame.

The crank pin B passes centrally through the cups $c$ $c$, and the comb $b$ forms with one cup $c$ a channel or race way in which a set of balls D is retained.

E represents a conical nut which screws onto the end of the crank pin, and forms with the other cup $c$ a second channel or race way in which is confined a second set of balls. The pressure on both sets of balls is regulated by the conical nut E, and this nut is locked by the jam nut F.

In the construction above described, the bearing of the pedal frame on the shaft is at or very near the center of said frame, whereby substantially all the advantages present in a center bearing pedal are secured; while the frame is without other ends than the diverging arms which connect the cups with the sides. The forming of the entire frame, including the ball cups, out of sheet metal renders the frame lighter than the frames heretofore used; and this is true even though the independent races are employed as described.

Having described my invention, I claim—

1. In a bicycle pedal, the combination of a pedal frame, two ball cups arranged back to back near the center of the pedal frame, and arms forming a part of the frame and connecting said cups to the sides thereof, with a crank pin which passes centrally through both cups, two cones secured on the crank pin and forming with the two cups two independent ball channels, and two sets of balls confined in said channels, substantially as set forth.

2. In a bicycle pedal, the combination of two cups arranged back to back, diverging arms integral with said cups, and side pieces with which said arms are connected, with a crank shaft which passes centrally through said cups, two cones secured to the shaft coacting with said cups to form two independent ball channels, and two sets of balls confined in said channels, substantially as set forth.

3. In a bicycle pedal, a frame consisting of two metallic pieces each comprising the following integral parts;—a cup $c$, two arms $c'$ diverging therefrom, and side pieces $c^2$, combined with a crank pin, a cone rigid therewith and a conical nut, substantially as set forth.

In testimony whereof I affix my signature in presence of two witnesses.

ARTHUR L. GARFORD.

Witnesses:
E. L. THURSTON,
FRANK. MILLER.